J. H. HAMMOND, Jr.
MARINE TRAILER FOR RADIANT ENERGY RECEIVING SYSTEMS.
APPLICATION FILED DEC. 23, 1918. RENEWED DEC. 24, 1921.
1,424,641.
Patented Aug. 1, 1922.
5 SHEETS—SHEET 4.
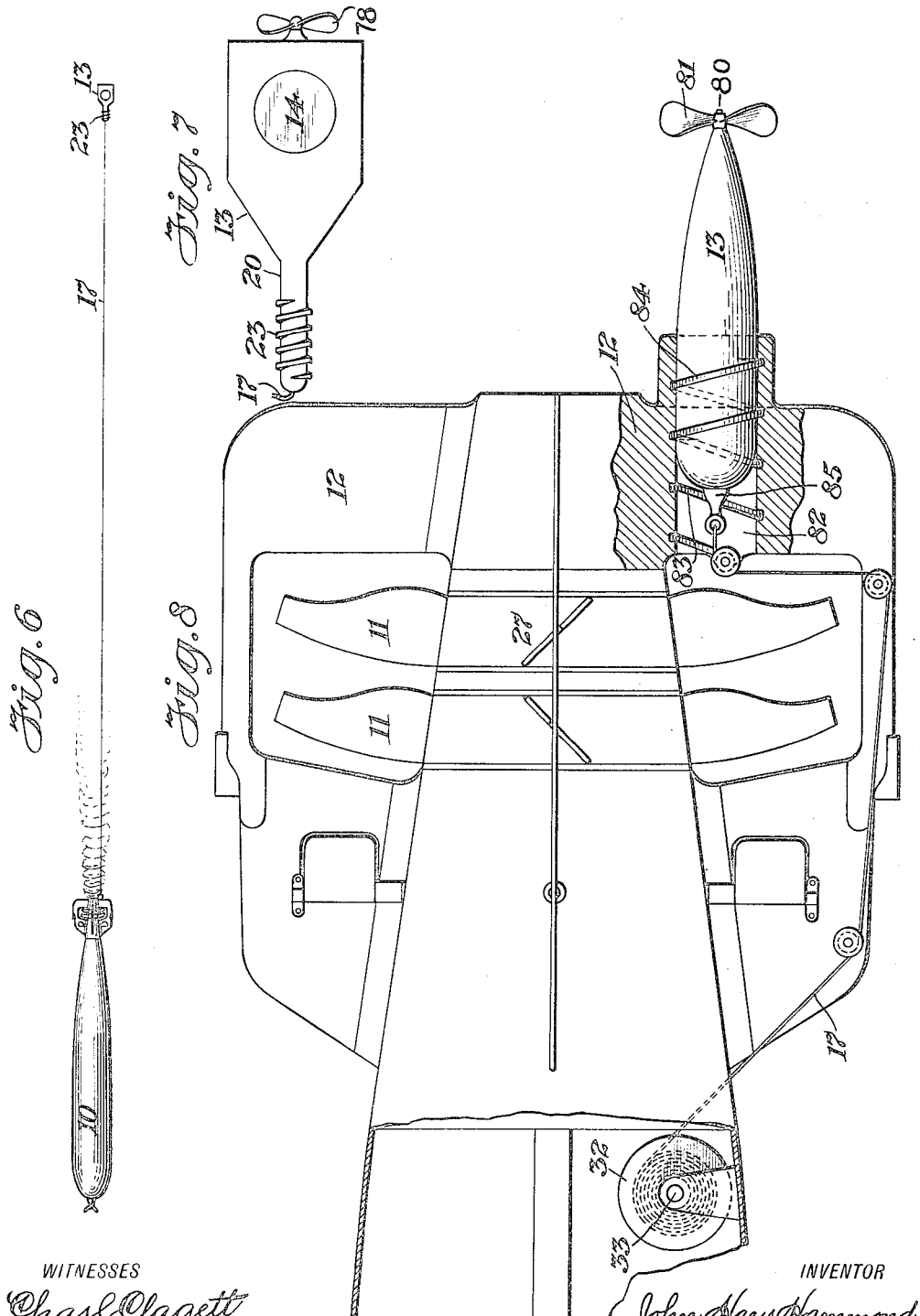
WITNESSES
Chas. F. Clagett
INVENTOR
John Hays Hammond Jr.
BY
A. J. Gardner
HIS ATTORNEY J. H. HAMMOND, Jr.
MARINE TRAILER FOR RADIANT ENERGY RECEIVING SYSTEMS.
APPLICATION FILED DEC. 23, 1918. RENEWED DEC. 24, 1921.
1,424,641.
Patented Aug. 1, 1922.
5 SHEETS—SHEET 5.
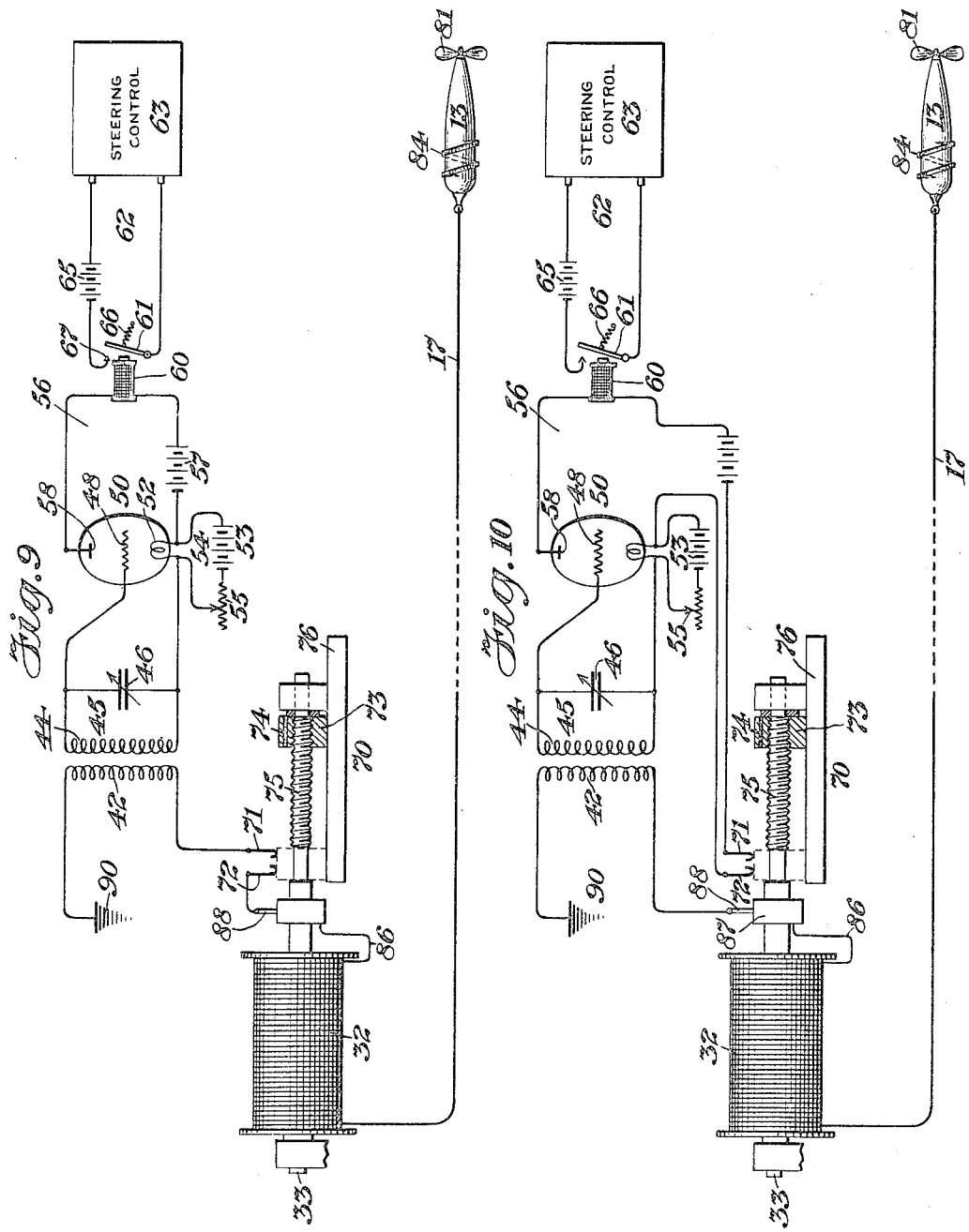

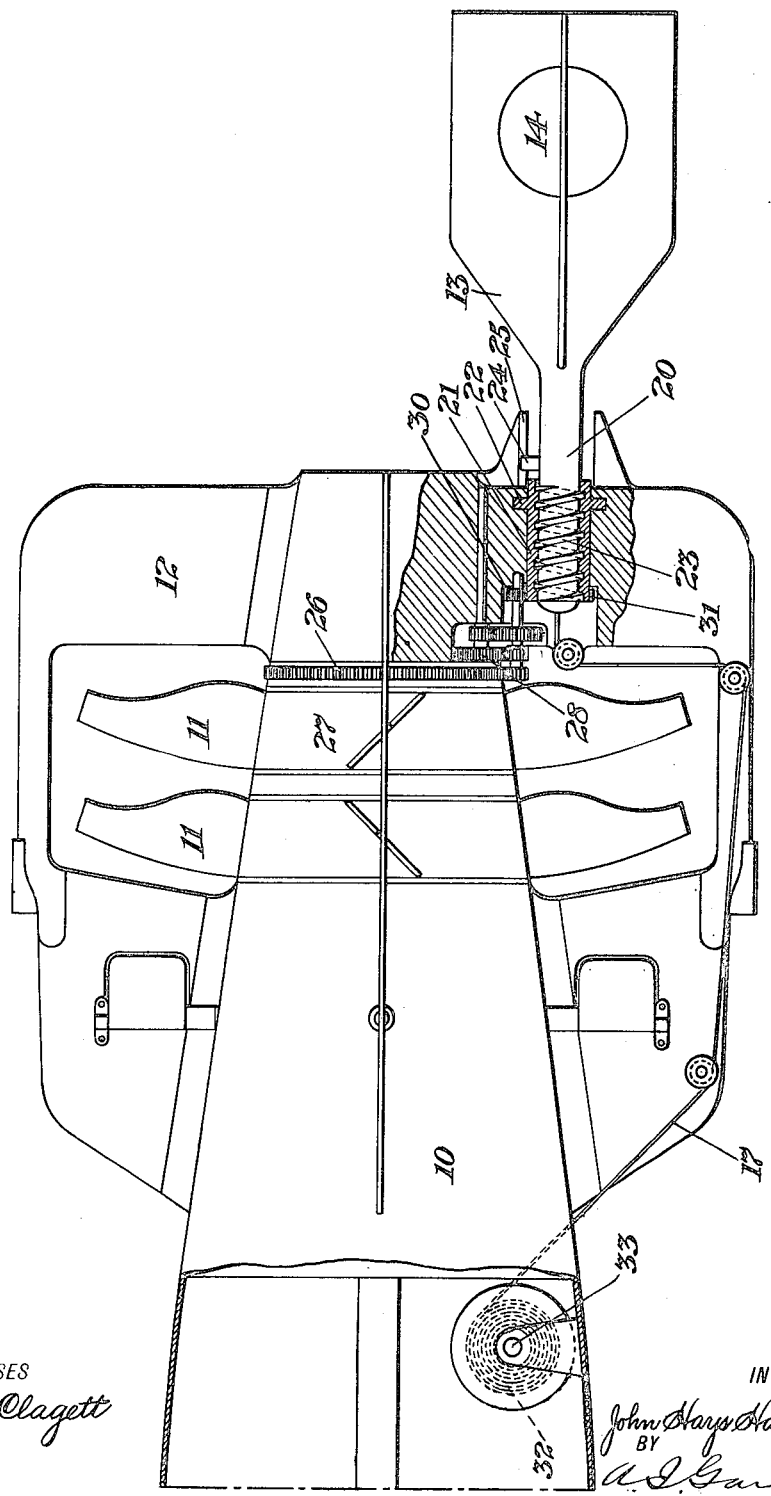

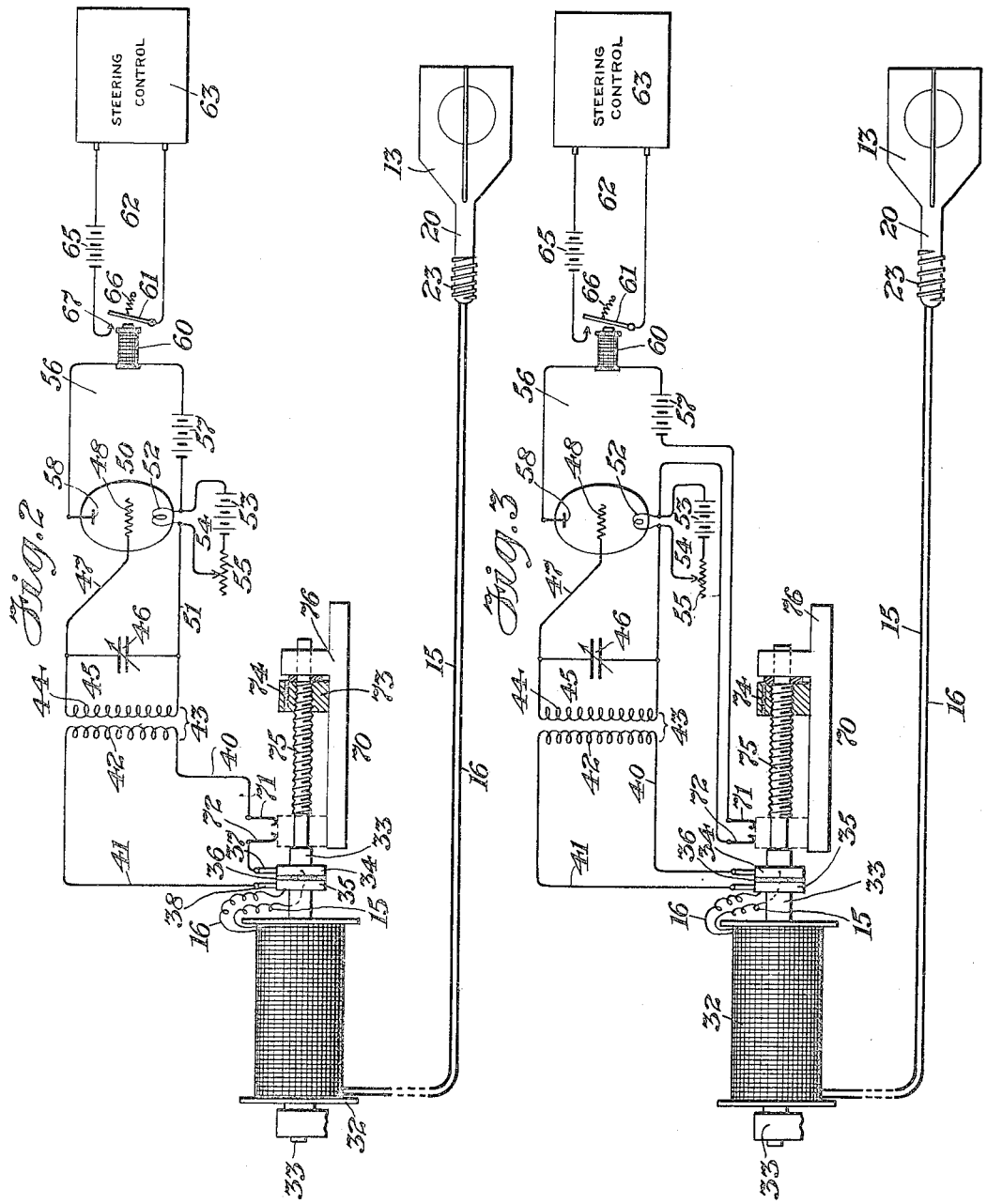

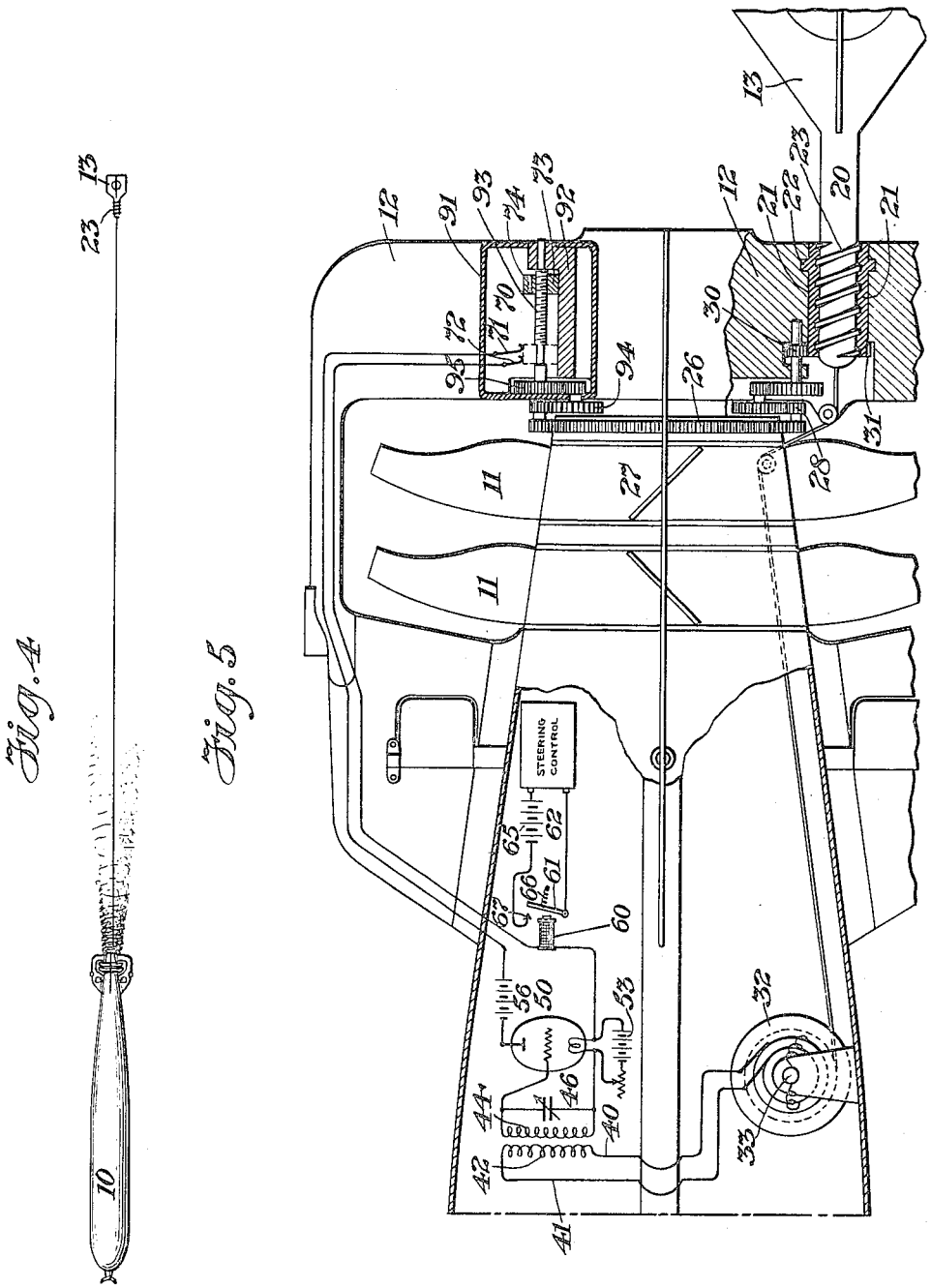

UNITED STATES PATENT OFFICE.

JOHN HAYS HAMMOND, JR., OF GLOUCESTER, MASSACHUSETTS.

MARINE TRAILER FOR RADIANT-ENERGY RECEIVING SYSTEMS.

1,424,641.  Specification of Letters Patent.  Patented Aug. 1, 1922.

Application filed December 23, 1918, Serial No. 267,992. Renewed December 24, 1921. Serial No. 524,739.

*To all whom it may concern:*

Be it known that I, JOHN HAYS HAMMOND, Jr., a citizen of the United States, and a resident of the city of Gloucester, in the county of Essex and State of Massachusetts (office and post-office address Hammond Radio Research Laboratory, Gloucester, Mass.), have invented certain new and useful Improvements in Marine Trailers for Radiant-Energy Receiving Systems, of which the following is a specification.

Some of the objects of the present invention are to provide a receiving device for radiant energy, in the form of a marine trailer or body arranged to be towed through the water by a torpedo or other suitable moving body; to provide means for automatically releasing a radiant energy receiving trailer from a torpedo after the torpedo starts upon its run; to provide a receiving system operated by signals transmitted from a trailing receiving device and provided with means for delaying the operation of the system for a predetermined time after the torpedo or other body upon which the system is installed has started upon its run; to provide means for releasing a radiant energy receiving trailer from a torpedo or other suitable body and means for rendering a receiving system, controlled by the trailer, operative to receive signals after the trailer has assumed a predetermined position with respect to the torpedo; and to provide other improvements as will hereinafter appear.

In the accompanying drawings, Fig. 1 represents a fragmentary elevation partly in section of a torpedo equipped with one form of detachable sound receiving trailer embodying the present invention; Fig. 2 represents diagrammatically one form of receiving system controlled from the trailer for operating the steering control of a torpedo or any suitable marine vessel from a distance; Fig. 3 represents another form of the system; Fig. 4 represents a side elevation of a torpedo and receiving trailer as it appears in operation; Fig. 5 represents a fragmentary elevation, partly in section, of a torpedo showing a complete installation of the invention with certain modifications; Fig. 6 represents a side elevation of a torpedo and modified form of trailer; Fig. 7 represents another form of trailer; Fig. 8 represents a fragmentary elevation, partly in section, of a torpedo with the modified form of trailer in attached position; Fig. 9 represents diagrammatically a modified form of receiving system for use with the form of trailer shown in Fig. 8 and Fig. 10 represents diagrammatically another modification of the receiving system of Fig. 8.

Referring to the drawings, one form of the present invention is shown in Fig. 1, as located upon the rear portion of a torpedo body 10 which is provided with the customary propellers 11 mounted for rotation as usual and surrounded in part by a fixed frame 12 for supporting a portion of the rudder structure.

For the purpose of controlling the steering mechanism of the torpedo 10 at will from a distance by radiant energy in the form of compressional waves transmitted through the water from a distant transmitting station a trailer 13, such as a suitable body arranged to be drawn by the torpedo 10 a suitable distance in its rear, is provided having a sound receiving diaphragm 14 arranged to produce through the medium of an electro-magnetic vibrator (not shown) electric oscillations which are transmitted by suitable conducting wires 15 and 16 both encased in a cable 17 attached to the forward end of the trailer 13. It is deemed unnecessary to illustrate the details of the vibrator since the same are fully shown and described in copending application Ser. No. 241,330.

In order to secure the trailer 13 in a detachable manner to the torpedo 10 the forward end of the trailer 13 is formed as an elongated cylindrical stem 20 arranged to fit snugly within a sleeve 21 which is rotatably mounted in the frame 12 but fixed against endwise movement by a flange 22 interfitting with the frame 12 in a well known manner. Thus under inoperative conditions the trailer 13 is attached to the torpedo 10 at the rear portion thereof and projects outwardly therefrom. Under operating conditions the trailer 13 is to be automatically released and one means for effecting this result consists in providing an internal worm groove in the sleeve 21 which, in attached position of the trailer 13, is in mesh with a worm gear 23 formed upon the stem 20 while a lug 24 rigid with the said stem 20 seats within a groove 25 in the frame 12 to prevent rotation of the trailer 13. In consequence a turning movement of the sleeve 21 in the required direction causes the worm gear 23 to feed the stem 20 outwardly and finally detach the trailer 13 from the torpedo 10 except for its connection thereto by the towing cable 17.

For causing the sleeve 21 to be automatically rotated at a predetermined speed when the torpedo 10 is released and starts upon its run, a gear 26 is provided, which is fixed to rotate with the hub 27 of the propeller 11 and transmits motion by way of a reduction chain of gears 28 to a pinion 30 which is in mesh with a gear 31 formed on or fixed to the sleeve 21. The construction is such that the gear 31 is rotated in the proper direction to cause the trailer 13 to be gradually ejected while the gear ratio is proportioned to cause a relatively slow turning movement of the sleeve 21 and thus delay the release of the trailer for a predetermined time. When released the trailer 13 assumes a position to the rear of the torpedo 10, as indicated in Fig. 4, such position being determined by the length of the towing cable 17 which is attached to and unwinds from a reel 32 fixed upon a shaft 33 suitably journalled upon the torpedo 10. The distance separating the trailer 13 from the torpedo 10 may be varied as desired by operating the reel 32 but it is preferably sufficient to locate the trailer 13 well removed from the wake of the torpedo and the disturbance caused by the exhaust.

For the purpose of utilizing the oscillations transmitted from the trailer 13 the conducting wires 15 and 16 leave the inner end of the reel 32 and are respectively joined to collars 34 and 35 forming a commutator which is fast to the reel shaft 33 to turn therewith. The collars 34 and 35 are insulated from each other and from the shaft by insulation 36 and provide circular peripheries of conducting material with which the brushes 37 and 38 have surface contact to complete the oscillatory circuit by way of conductors 40 and 41 through a primary coil 42 of a transformer 43. This transformer 43 has its secondary coil 44 in an oscillatory circuit 45 including a variable condenser 46 and which circuit 45 is tuned to the frequency of the received oscillations. One side of the condenser 46 is connected by a conductor 47 to a grid 48 forming a part of a detector 50 and the other side of the condenser 46 is connected by a conductor 51 to a heated filament 52 also forming a part of the detector 50. The filament 52 is heated by a battery 53 in a local circuit 54 and the current is regulated by a rheostat 55 in a well known manner. The detector 50 is here shown as of the gaseous type but it will be understood that any suitable form of amplifier may be utilized for the purpose and that the present construction is only by way of example. This amplifier or detector 50 is arranged to control a circuit 56 receiving a unidirectional current from a battery 57 or other suitable source, the terminals of which circuit are the filament 52 at one end and an electrode 58 which forms a part of the detector 50. The circuit 56 also includes a relay magnet 60 having its armature 61 in a circuit 62 which actuates the steering control 63 in the desired manner. A suitable source, as a battery 65, supplies current to the circuit 62 and under inoperative conditions the armature 61 is held by a spring 66 away from a contact point 67 which forms a terminal of the circuit. When the relay 60 is energized the armature 61 is brought into contact with the terminal 67 and thus closes the circuit so that the transmitted signal operates the steering control in the predetermined manner. It will be understood that the steering control 63 may be of any suitable type arranged to be actuated by means controlled from a distance.

In order to prevent operation of the receiving system prior to the trailer 13 reaching its operative position and thereby disturbing the set condition of the steering mechanism, a circuit closer 70 is preferably employed, one form of which consists of two yielding contacts 71 and 72 arranged in spaced relation to normally form a break in the oscillatory circuit conductor 40. This break in the circuit is arranged to be closed, in the present instance, by a leader nut 73 which carries, but is insulated from, a plate of conducting material 74. This nut 73 is mounted upon a threaded extension 75 of the reel shaft 33 which extends laterally and is journalled in a fixed bearing bracket 76. The length of the threaded portion 75 as well as the thread pitch is proportioned relative to the length of cable 17 to be released to place the trailer 13 in its proper towing position. Also the threads are arranged to advance the leader nut 73 toward the contacts 71 and 72, as the reel unwinds, so that when the required length of cable has unwound the leader nut 73 will come to rest in position to bridge the contacts 71 and 72 and close the break in the oscillatory circuit. The receiving system is now in operative condition and ready to respond to signals transmitted from the receiver carried by the trailer 13.

In the system shown in Fig. 3, the delayed action circuit closer 70 is arranged to bridge the terminal contacts 71 and 72 which, in this form, are located in a break in the detector controlled circuit 56, instead of in the circuit including the conductor 40 as shown in the form of the invention illustrated in Fig. 2.

In Fig. 5 an installation of the receiving system is shown, having a modified form of actuating means for the circuit closer 70 whereby the movement of the leader nut 73 is controlled directly from the propeller mechanism. In this form the frame 12 is provided with a water tight casing 91 forming a support for journal bracket 92 in which is rotatably mounted a threaded spindle 93 arranged to feed the leader nut 73 to its bridging position across the contacts 71 and 72.

Rotation of the spindle 93 is accomplished through the medium of a reduction gear chain 94 meshing at one end with a gear 95 on the spindle 93 and at the other end with the propeller driven gear 26. The ratio of this gear chain 94 is substantially the same as the reduction gear chain 28 for rotating the sleeve 21 and as the pitch of the threaded portion 93 is proportioned with respect to the time required for the trailer 13 to assume its operative towing position it will be evident that the leader nut 73 arrives in its bridging position substantially simultaneously with the complete unreeling of the trailer 13.

Referring to Fig. 7, another form of the invention is shown wherein the trailer 13 has no horizontal vanes and is provided with a propeller 78 in order to make it tow properly.

Referring to Fig. 8, another form of the invention is shown wherein the trailer 13 has a body of substantially stream line contour tapering towards its rear end where it terminates in a stub shaft 80 having a propeller 81 rigidly secured thereto for the purpose of imparting a rotary movement to the trailer body 13 as it is drawn through the water by the cable 17. The cable 17 is attached to this form of trailer by a swivel joint, so that when the trailer rotates it will not rotate the cable 17.

To automatically detach this form of trailer 13 from the torpedo frame 12 a bore 82 is formed in the frame 12 and provided with a spiral groove 83 constructed to receive a worm spiral 84 which is turned on or otherwise fixedly secured to the body of the trailer 13, the arrangement being such as to cause the trailer 13 to detach itself from the frame 12 by an unscrewing movement caused by the rotation of the body under the action of the propeller as it is drawn forwardly through the water. This form is arranged to act as a trailing antenna to receive radiant energy in the form of electrical impulses transmitted from a distance and to that end the insulated cable 17 encases a single conducting strand 86 which leaves the reel 32 at its inner end and joins a collar 87 fixed to, but insulated from the reel shaft 33. The collar 87 has a circular periphery of conducting material with which a brush 88 has surface contact and completes the antenna circuit by way of the primary coil 42 and ground 90.

In view of the fact that the receiving circuits illustrated in Figs. 9 and 10 are here shown as substantially similar to the receiving circuits of Fig. 2 it is believed unnecessary to repeat the detailed description thereof and therefore like parts will be identified by similar reference numerals.

In the system shown in Fig. 9 the delayed action circuit closer 70 is arranged to bridge terminal contacts 71 and 72 which are placed in a break in the antenna circuit, while in the form of the system shown in Fig. 10 this closer 70 is arranged to have the leader nut 73 bridge terminal contacts 71 and 72 which are placed in a break in the detector controlled circuit 56.

From the foregoing it will be apparent that a radiant energy receiving device in the form of a towed antenna has been provided which under inoperative conditions is coiled up in the torpedo or other suitable body but under operative conditions is arranged to be automatically paid out and assume a predetermined position in the rear of the torpedo when the latter is running. Further the operation of the trailing antenna would be improved by being in the area unaffected by the surge produced by the torpedo exhaust and other disturbances in the wake, as the air bubbles thereby produced would tend to decrease the conductivity of the water.

The receiving system, which is arranged to receive signals transmitted from the towed receiving antenna, is further provided with means which, under certain conditions, render the system unresponsive to any transmitted signals, but when those conditions are altered, as for instance by the trailer reaching its normally operative position, the system automatically becomes operative and can respond to signals of a predetermined character transmitted to the trailer.

It should, however, be understood that the forms of the present invention here shown and described are only by way of example and the invention is not to be restricted in its scope since obviously it is susceptible of modification in many particulars without departing from the invention.

Having thus described my invention, what I claim is:

1. The combination of a marine body, a trailer connected to said body and arranged for radiant energy signalling purposes, means for automatically detaching said trailer from said body, and towing means for said trailer.

2. The combination of a marine body, a trailer connected to said body and arranged for radiant energy signalling purposes, means operative to detach said trailer from said body a predetermined period after said body has begun to move, and towing means for said trailer.

3. The combination of a marine body, a trailer arranged for radiant energy signalling purposes, means engaging said trailer for holding said trailer attached to said body, means for causing said engaging means to release said trailer from said body, and towing means for said trailer.

4. The combination of a marine body, a trailer arranged for radiant energy signalling purposes, means engaging said trailer for holding said trailer attached to said body, means operated by the movement of said body for causing said engaging means to release said trailer from said body, and towing means for said trailer.

5. The combination of a marine body, a trailer arranged for radiant energy signalling purposes, means engaging said trailer for holding said trailer attached to said body, power-actuated means for causing said engaging means to release said trailer from said body, and towing means for said trailer.

6. The combination of a marine body, a trailer arranged for radiant energy signalling purposes, means including a screw-threaded construction for attaching said trailer to said body, means to rotate one portion of said screw-threaded construction to cause said trailer to be released from said body, and towing means for said trailer.

7. The combination of a marine body, a trailer arranged for radiant energy signalling purposes, a receiving system on said body operatively connected to said trailer, towing means for said trailer, a reel for said towing means, and means operated by the movement of said reel for rendering said receiving system operative.

8. The combination of a marine body, a trailer arranged for radiant energy signalling purposes, a receiving system on said body operatively connected to said trailer, means engaging said trailer for holding said trailer attached to said body, means for releasing said engaging means to cause said trailer to be detached from said body, and means for rendering said receiving system operative a predetermined time after said trailer has been detached.

9. The combination of a marine body, a trailer arranged for radiant energy signalling purposes and detachably connected to said body, a receiving system on said body operatively connected to said trailer, a delayed acting means for detaching said trailer, a circuit closer arranged to control said receiving circuit, and means operated by the release of said trailer for closing said circuit closer to render said receiving system operative.

10. The combination of two movable bodies, propelling means mounted on a single one of said bodies for propelling both bodies, towing means interconnecting said bodies, and means actuated by a predetermined movement of the first named body to render said towing means active.

11. The combination of two movable bodies, driving mechanism on a single one of said bodies, and means for causing the other of said bodies to assume a towed position behind the first named body rendered active upon predetermined movement of said driving means.

12. The combination of a movable body adapted to move through a medium, a trailer connected with said body comprising means for signalling by radiant energy, means co-operating with the surrounding medium for propelling said movable body and actuated at a speed proportional to the rate of movement of the body relative to the medium, and means operated upon such movement to cause the trailer to be set in towing position behind said body.

13. The combination of a movable body adapted to move through a medium, a trailer connected with said body comprising means for signalling by radiant energy, means co-operating with the surrounding medium for propelling said movable body and actuated at a speed proportional to the rate of movement of the body relative to the medium, and means automatically operated upon such movement to cause the trailer to be set in towing position behind said body.

14. The combination of a movable body adapted to pass through a medium, a separable trailer arranged to be towed by said body, said trailer including radiant energy responsive means in operative relation with the medium, means positioned on the movable body and co-operating with the surrounding medium for moving said body, and means operated upon the movement of said means to cause the trailer to assume a towed position separate from said body.

15. The combination of a movable body adapted to pass through a medium, a separable trailer arranged to be towed by said body, said trailer including radiant energy responsive means in operative relation with the medium, means positioned on the movable body and co-operating with the surrounding medium for moving said body, and means automatically operated upon the movement to cause the trailer to assume a towed position separate from said body.

16. The combination of a movable body supported by a natural medium, a trailer connected to said body and arranged for radiant energy signalling purposes, means actuated upon movement of the body through the medium for automatically detaching said trailer from said body, and towing means for said trailer.

17. The combination of a moving body, a trailer connected with said body suitable for the reception or transmission of radiant energy, and means operated by the action of the surrounding media to automatically detach said trailer from said body so as to cause it to assume a towed position behind said body.

Signed at New York in the county of New York and State of New York this 19th day of December A. D. 1918.

JOHN HAYS HAMMOND, Jr.